US010621598B1

(12) United States Patent
Greenwald

(10) Patent No.: US 10,621,598 B1
(45) Date of Patent: Apr. 14, 2020

(54) METHODS AND SYSTEMS FOR FACILITATING INTERACTIONS

(71) Applicant: Richard Greenwald, Yorktown Heights, NY (US)

(72) Inventor: Richard Greenwald, Yorktown Heights, NY (US)

( * ) Notice: Subject to any disclaimer, the term of this patent is extended or adjusted under 35 U.S.C. 154(b) by 894 days.

(21) Appl. No.: 15/134,952

(22) Filed: Apr. 21, 2016

Related U.S. Application Data

(60) Provisional application No. 62/151,039, filed on Apr. 22, 2015.

(51) Int. Cl.
*G06Q 10/00* (2012.01)
*G06Q 30/02* (2012.01)

(52) U.S. Cl.
CPC .................. *G06Q 30/0201* (2013.01)

(58) Field of Classification Search
None
See application file for complete search history.

(56) References Cited

U.S. PATENT DOCUMENTS

| | | | | |
|---|---|---|---|---|
| 4,654,793 A * | 3/1987 | Elrod | ............... | G06K 17/0022 235/380 |
| 4,806,743 A * | 2/1989 | Thenery | ............... | G06K 17/0022 235/462.45 |
| 5,898,363 A * | 4/1999 | Altilio | ............... | G08B 7/062 340/286.05 |
| 5,936,542 A * | 8/1999 | Kleinrock | ............... | G07C 9/00007 235/380 |
| 6,194,992 B1 * | 2/2001 | Short | ............... | G07C 9/00007 340/5.9 |
| 6,418,372 B1 * | 7/2002 | Hofmann | ............... | G01C 21/20 701/434 |
| 6,557,007 B1 * | 4/2003 | Pekowski | ............... | G06Q 30/02 705/37 |
| 6,654,651 B2 * | 11/2003 | Ashida | ............... | G06F 3/1204 235/380 |
| 7,590,688 B2 * | 9/2009 | Franke | ............... | G06Q 10/10 705/80 |

(Continued)

OTHER PUBLICATIONS

Gregory D. Abowd, Christopher G. Atkeson, Jason Hong, Sue Long, Rob Kooper, and Mike Pinkerton (Cyberguide: A mobile context-aware tour guide, Wireless Networks 3 (1997) 421-433). (Year: 1997).*

(Continued)

*Primary Examiner* — Hafiz A Kassim
(74) *Attorney, Agent, or Firm* — DLA Piper LLP (US)

(57) ABSTRACT

Methods and Systems for facilitating interactions. Exhibitor information about an exhibitor can be received. Prospect information about a prospect can be received. Ambassador information about an ambassador can be received. A prospect QR code of a prospect device can be captured with an ambassador QR reader in order to link together the ambassador information and the prospect information. A universal unique identifier (UUID) code associated with the prospect QR code can be compared against information in the database assigning UUID codes to prospects. A push notification can be sent to the prospect device associated with the prospect assigned the UUID code when a match is found linking the UUID code to the prospect.

32 Claims, 13 Drawing Sheets

(56) References Cited

U.S. PATENT DOCUMENTS

| | | | | |
|---|---|---|---|---|
| 7,861,934 B1* | 1/2011 | Williams | G06Q 30/02 | 235/462.09 |
| 8,019,819 B2* | 9/2011 | Monteverde | E04H 3/10 | 709/205 |
| 8,700,696 B2* | 4/2014 | Franke | G06Q 30/0211 | 705/14.4 |
| 8,943,044 B1* | 1/2015 | Saylor | G06Q 50/01 | 707/722 |
| 9,491,584 B1* | 11/2016 | Mendelson | G08G 1/14 | |
| 2001/0030231 A1* | 10/2001 | Grossman | G06Q 30/02 | 235/375 |
| 2002/0168084 A1* | 11/2002 | Trajkovic | G06K 9/00778 | 382/100 |
| 2003/0007464 A1* | 1/2003 | Balani | G06Q 30/0601 | 370/310 |
| 2003/0013146 A1* | 1/2003 | Werb | G01V 15/00 | 435/9 |
| 2003/0195833 A1* | 10/2003 | Baranowski | G06Q 30/02 | 705/37 |
| 2004/0077367 A1* | 4/2004 | Sama | H04H 20/61 | 455/518 |
| 2004/0093265 A1* | 5/2004 | Ramchandani | G06Q 30/02 | 705/14.25 |
| 2005/0071186 A1* | 3/2005 | Manzo | G06Q 20/202 | 705/21 |
| 2005/0136845 A1* | 6/2005 | Masuoka | G01S 5/0294 | 455/67.14 |
| 2005/0197118 A1* | 9/2005 | Mitchell | H04W 48/14 | 455/434 |
| 2006/0242154 A1* | 10/2006 | Rawat | G06F 16/168 | |
| 2007/0156461 A1* | 7/2007 | Carson | G06Q 40/08 | 705/4 |
| 2008/0312946 A1* | 12/2008 | Valentine | G06Q 20/382 | 705/64 |
| 2009/0117883 A1* | 5/2009 | Coffing | H04W 4/21 | 455/414.1 |
| 2010/0088372 A1* | 4/2010 | Shridhar | G06F 21/41 | 709/204 |
| 2010/0228602 A1* | 9/2010 | Gilvar | G06Q 30/0252 | 705/14.5 |
| 2011/0145729 A1* | 6/2011 | Shulman | G06Q 30/02 | 715/760 |
| 2011/0276440 A1* | 11/2011 | Collins | G06Q 10/06 | 705/28 |
| 2011/0306323 A1* | 12/2011 | Do | G01C 21/20 | 455/414.1 |
| 2012/0197949 A1* | 8/2012 | Taylor | G06Q 10/06 | 707/808 |
| 2013/0155173 A1* | 6/2013 | Brady | H04N 7/15 | 348/14.03 |
| 2013/0181867 A1* | 7/2013 | Sturdivant | G06Q 30/0241 | 342/368 |
| 2014/0032261 A1* | 1/2014 | Kotak | G06Q 30/0202 | 705/7.29 |
| 2014/0032705 A1* | 1/2014 | Williams | H04L 63/08 | 709/217 |
| 2014/0142979 A1* | 5/2014 | Mitsunaga | G16H 10/60 | 705/3 |
| 2014/0156319 A1* | 6/2014 | Deeb | G06Q 30/06 | 705/5 |
| 2014/0207865 A1* | 7/2014 | Carr | H04L 67/2833 | 709/204 |
| 2014/0257883 A1* | 9/2014 | Thompson | G06Q 10/02 | 705/5 |
| 2014/0342760 A1* | 11/2014 | Moldavsky | G06Q 30/0261 | 455/456.3 |
| 2014/0358632 A1* | 12/2014 | Graff | G06F 16/9537 | 705/7.29 |
| 2015/0134447 A1* | 5/2015 | Schoeneberger | G06Q 30/0251 | 705/14.49 |
| 2015/0149250 A1* | 5/2015 | Fein | H04W 4/029 | 705/7.31 |
| 2015/0242585 A1* | 8/2015 | Spiegel | G06F 19/3418 | 705/2 |

OTHER PUBLICATIONS

Philip J. Rosson and F. H. Roll Seringhaus (Visitor and Exhibitor Interaction at Industrial Trade Fairs, Journal of Business Research 32, 81-90 (1995)) (Year: 1995).*

* cited by examiner

FIG. 1 (Continued)

REGISTRATION PROCESS: brief description

REGISTRATION PROCESS: Participating company Exhibitor 104 registers on website 101 and uploads information 111 & 113 concerning General prospects 106 and Specific prospects 107 & 109 to the database 103. Participating company Exhibitor 104 downloads mobile application which includes QR reader 121. General prospects 108 and Specific prospects 109 register and include information concerning desired exhibitors for business supply needs 115. General and Specific prospects download mobile application with includes QR symbols 117 and list of exhibitor booths for desired business supply needs 119.

FIG. 8
SAMPLE SCREEN OF PROXIMITY ALERT PROCESS:
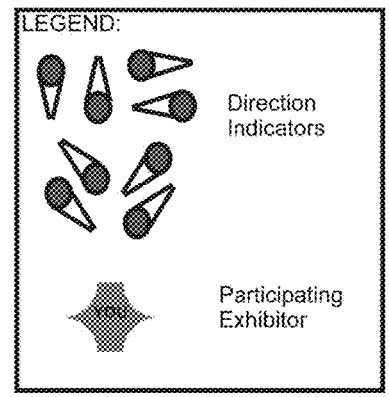
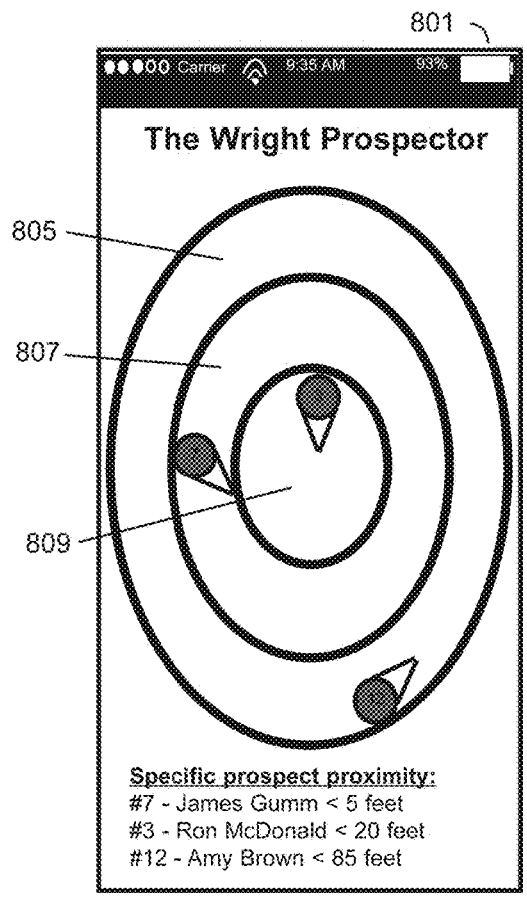
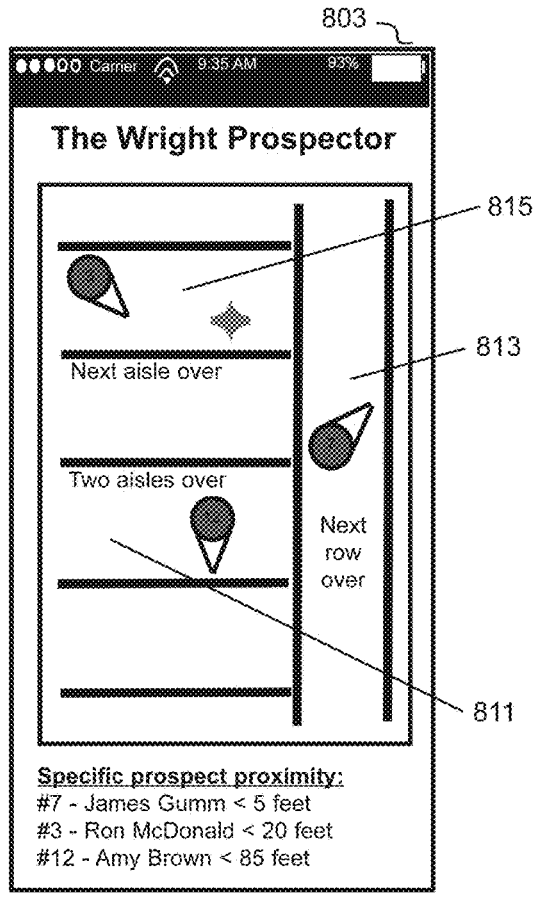
Sample screens of Proximity Alert Process: The mobile device of the participating Exhibitor receives proximity alert information 801 and 803 relating to identified Specific Prospect attendees (a) 109 a and 109 b who are within proximity of the exhibitor's trade show booth.

FIG. 10

SAMPLE OF PARTIALLY STAMPED COUPON GRAPHIC ON MOBILE DEVICE OF PARTICIPATING ATTENDEE:

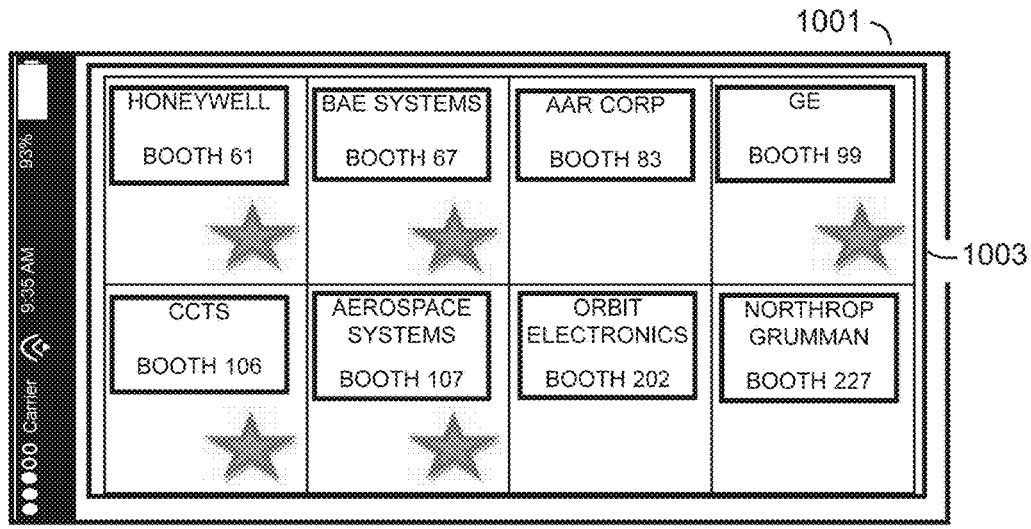

Sample of partially stamped coupon graphic on mobile device of participating attendee: The mobile devices of general 108 and specific 109 prospect attendees display a graphic 1001 showing the names and booth locations of the participating exhibitors 104. When a meeting transaction is registered 603 between a general 108 or specific 109 prospect attendee and a participating exhibitor 104, the graphic is updated with a symbol 1003.

FIG. 12

SAMPLE OF AMBASSADOR AND PROSPECT INFORMATION DOWNLOADED TO MOBILE DEVICE OF EACH PARTY:

Sample of Ambassador and prospect information downloaded to mobile device of each party: The mobile device of the Ambassador 401a receives the picture 415, if available, and general information such as name, title and company of the General and Specific prospect attendees participating in the program. The mobile device of the General and Specific prospect attendees 403a participating in the program receive a picture of the Ambassador 413, their name and the assembly location.

METHODS AND SYSTEMS FOR FACILITATING INTERACTIONS

CROSS-REFERENCE TO RELATED APPLICATIONS

This application claim priority to U.S. Provisional Application No. 62/151,039, filed Apr. 22, 2015, which is incorporated by reference in its entirety.

BRIEF DESCRIPTIONS OF THE DRAWINGS

FIG. 8 illustrates sample screen shots on the mobile device of proximity locations of attendees according to an embodiment of the invention.

FIG. 10 is a sample screen shot on the mobile device of an attendee according to an embodiment of the invention.

FIG. 12 illustrates sample screen shots of mobile devices of participating general and specific attendees and an ambassador according to an embodiment of the invention.

DETAILED DESCRIPTION OF SEVERAL EMBODIMENTS

Figure 1:
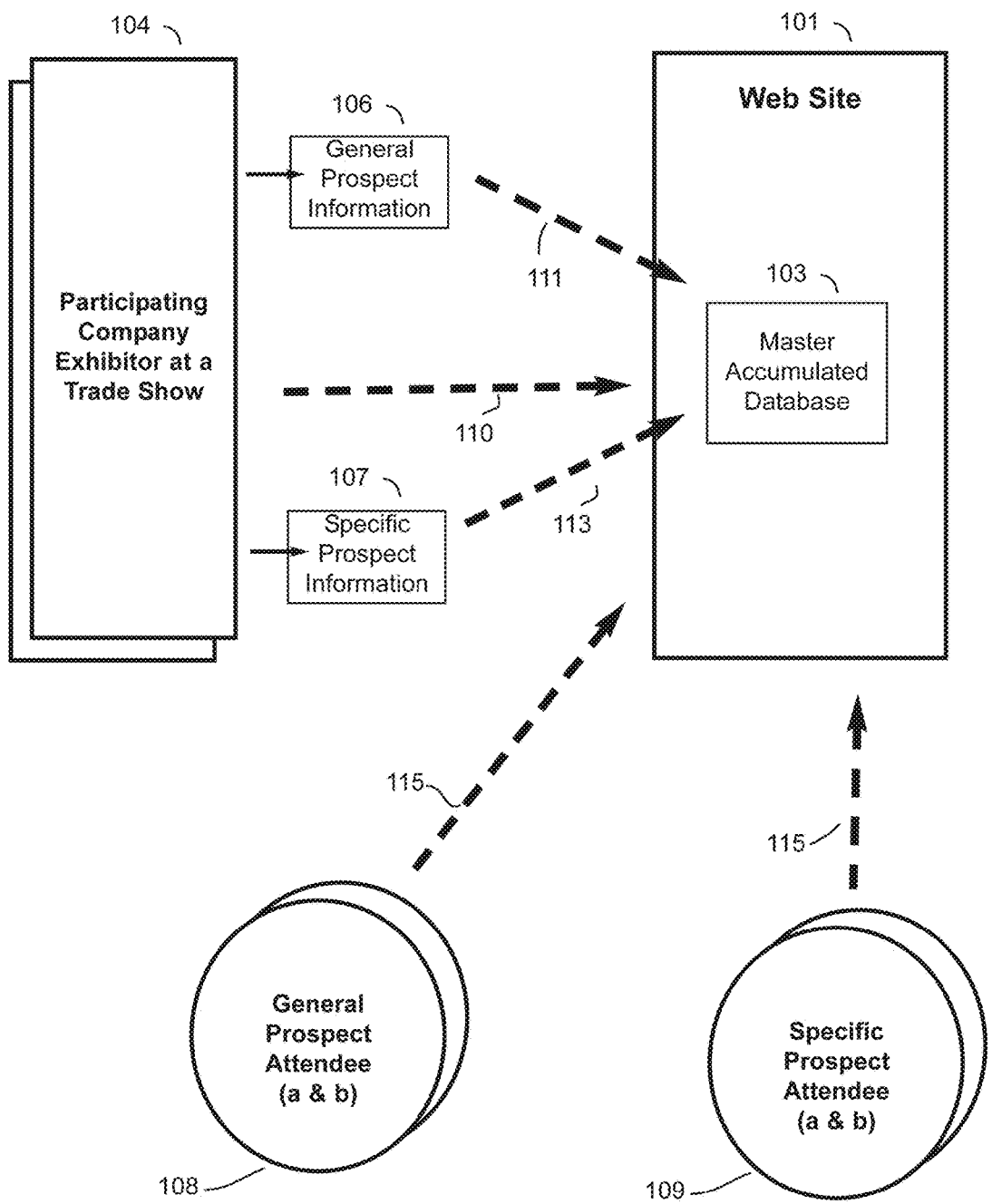
FIG. 1 is a block drawing related to the uploading of registration information according to an embodiment of the invention.

Methods and systems described herein may facilitate efficient connections between individuals, for example an exhibitor at a trade show (e.g., an exhibitor) and a desired trade show attendee (e.g., a general and specific prospect) and/or a trade show attendee with their desired type of exhibitor. Both exhibitor and attendee may be pre-qualified. Methods and systems described herein may involve a program for identifying, contacting, and/or enticing a subset of trade show attendees (general prospects) to visit and engage with participating exhibitors. Within that subset of general prospect attendees may be a further subset, known as specific prospects, who may be high value potential customers of a particular exhibitor(s). Inducements may be offered to the general prospects for participation. A general prospect may then be presented with one or more rewards based at least in part on the prospect's participation in the program. These rewards may include, but are not limited to, being personally directed to participating exhibitor booths by an ambassador (e.g., a third party representative who engages the attendee and guides them to the participating exhibitors booths), locating exhibitors who qualify as capable of fulfilling identified business needs of the general prospect and displaying them on their mobile device, offering prizes through gamification and point collection, as well as other inducements. Further, systems and methods of tracking and alerting an exhibitor, electronically in real time via a computer application on a mobile device, that a potential desired qualified trade show attendee (specific prospect) is nearby and displaying the proximity of that individual so that the exhibitor may turn their attention to that approaching specific prospect may be provided. Applications may be provided for the mobile devices of at least three party categories at a trade show: participating exhibitors, general and specific prospect attendees, or an ambassador, or a combination thereof. Additionally, the systems and methods described herein may provide instantaneous recording of the interaction between the parties (e.g., exhibitor, prospect, or ambassador, or any combination thereof.) Furthermore, updates on the interactions, or results of the interactions, or reports of the results, or any combination thereof, may be shared.

Over the last decade, a byproduct of advances in computer related technology (e.g., email, texting, etc.) is the increasing separation of individuals from communicating with each other on a one to one basis. Computer related technology may be used to facilitate human-to-human interaction. For example, companies may be interested in ensuring that they spend their time marketing and selling to the type of person who is likely to buy their product or service. Likewise, buyers may have the goal of meeting a new supplier to solve a present or future supply need. Firms that supply products and services within an industry may know their prospective "type" of customer. All members within their industry may not purchase their products and services, just as someone outside of their industry may not purchase their products and services. Instead, there may be a subset of general potential customers that a firm is capable of selling to based upon certain defined criteria such as, but not limited to: the categorization of the firm who employs the potential customer, the title of the potential customer, the purchasing capacity of the potential customer, or the expressed and perceived need of the potential customer, or any combination thereof. These firms may be aware of specific potential customers to whom they would like to sell their products and services and may spend considerable effort seeking business relationships with these specific potential customers. But many times, companies may waste their resources on individuals who have no ability to become a customer.

Systems and methods described herein may empower both sellers and buyers to encourage the right type of trade show attendee to visit the booths of exhibitors who have products and services relevant to the attendee. For example, a matching system may identify the exact location of a customer or supplier within a venue (such as a trade show) on a mobile device to facilitate such meetings. Specifically, systems and methods described herein may involve qualifying, identifying, and facilitating the interaction between a company and their "general prospect" potential customer and additionally to alert the company, with real time information on a mobile device, of the proximity of a "general prospect" and/or "specific prospect" potential customers.

Using a trade show as an example, participating companies who are exhibiting at a trade show may access a website, register, complete a categorical listing form, generally describe their business capabilities, and identify the type of individual whom they would consider a "general prospect". Additionally, the participating exhibitor company may have the opportunity to identify a finite number of high value potential customers known as "specific prospects" by criteria such as name, company, job title, geographic location, or type of business. A master list of the "general" and "specific" prospects of all the participating exhibitor companies may be created.

The trade show attendees (e.g., general prospects) may be contacted through various marketing techniques and urged to register on (e.g., either on a different website, or a same section or a different section of the same website). During registration, the general prospect attendee may be required to provide identification information and may also be queried as to the likelihood of attending the particular trade show. The attendee may be offered the opportunity to indicate current and upcoming business supply requirements for products and services that they may like to locate at the trade show. This may allow the system to locate and communicate electronically, through a mobile application, the exact location of an exhibitor or number of exhibitors at the trade show that may be able to satisfy those particular business supply needs. Additionally, attendees (e.g., general prospects) who participate in the program may be rewarded for their activities. The type and amount of the reward may vary based at least in part on, for example: visiting a daily number of booths of participating exhibitors and/or the number of days the attendee participates, etc. Rewards may include, for example: drawing for prizes, cash rewards, reward points, coupons, discounts, meals, gift cards, or other incentives, or any combination thereof.

Both the exhibiting company and the general and specific prospect attendees may be provided a computer application which may be downloaded onto their mobile devices and which may include a unique identifier code for each. Additionally, the mobile application software for the general and specific prospect attendee may include a unique Quick Response (QR) symbol (e.g., a code) which may relate to that attendee exclusively and may be linked to the information the prospect has previously submitted on the invention website. Similarly, included in the download for the participating exhibitor company may be a unique identifying QR reader that may collect the data from the QR symbol of a general or specific prospective attendee with whom they interact (e.g., during a meeting or other interaction at a trade show or other location) and may store and compile that information on one or more servers. The information may be provided to the participating exhibitor company in real time on their mobile device in some embodiments.

Additionally, the described methods and systems may provide close proximity location information (e.g., about a general prospect or a specific prospect) on a mobile device of a user. With regards to a specific prospect attendee, for example, when that person is within close proximity to the participating exhibitor company (e.g., as defined as being within a preset distance), a visual and/or auditory alert may be communicated to the mobile device of the participating exhibitor company. The alert may indicate the name of the approaching specific prospect attendee along with their location and proximity to the participating exhibitor company. This information may be updated in real time as the individual nears the participating exhibitor company booth. The visual prompt may or may not include a photograph of the specific prospect obtained from, for example, public records, social media web sites, or provided by the specific prospect themselves or other sources.

The mobile application for the general and specific prospect may include a list of participating exhibitors to be visited each day of the trade show, a graphically displayed coupon showing which exhibitors have been visited and which ones remain to be seen, number and position of other prospects participating in the program and their relative location within the convention hall, and/or other information. This information may be updated in real time. Additionally, the attendee may be provided with a list of exhibiting companies who may be potential suppliers to satisfy their current and future business needs.

The participating exhibiting companies may download their version of the mobile application onto their mobile devices. This application may include a unique QR reader, software which records and achieves meeting transactions, and/or software code that alerts them when a pre-identified specific potential customer is approaching from within a specified distance, for example. Multiple salespeople within an exhibiting company's trade show booth may be able to define their own individual lists of specific prospects and may be alerted when a member of that group is within a predetermined proximity, such as identifying the location of that person within a convention hall. A beacon device (e.g., an iBeacon equipped device or other Bluetooth low energy or Bluetooth Smart device such as Android devices with Bluetooth Smart capabilities, Nordic Semiconductor µBlue devices, TI SensorTag devices, etc.) may be used to broadcast an outbound signal concerning a product to the mobile device of any individual within a specified range regardless of the qualifications of the individual. In some embodiments, the beacon device may detect the unique identifier of the attendee which was downloaded to that persons' mobile device and communicate that location information to the mobile device of the stated salesperson of the participating exhibiting company, thereby providing location information within a defined area (such as the convention hall of a trade show) of a qualified lead to the participating exhibiting company. Thus, the beacon may be used as active components of the system, detecting devices and sending information about the detected device, rather than merely broadcasting data.

Beacons may include transmitters that send out a signal at an arbitrary frequency one or more times per second (e.g., 1-100 times per second) depending upon the desired trade off effect on accuracy and battery life. Beacons may be incorporated into any small electronic devices. For example, a beacon may transmit a UUID (Universally unique identification) at a known frequency (e.g., 2.4835 GHz). The UUID may be, for example, a 128 bit value broken down into 32 hexadecimal digits of five segments separated by hyphens. The UUID may be received by a mobile device within range. The mobile device may have its Bluetooth and/or WI-FI capabilities open and active. The software on the mobile device may accesses the Internet or a database and may look up the UUID to determine its physical location in relation to the beacon. The distance may be characterized as either far (up to 100 feet, for example), near (up to 5 feet, for example), or immediate (within inches, for example). The beacon may also push information to the receiving device, for example a picture of the specific attendee along with their basic identification information such as name, title, company, address, phone, email, etc.

Ultimately, when the participating exhibitor company and the general or specific prospect meet or interact, the prospect may display their unique QR symbol from their mobile device. The unique QR reader from the mobile device of the participating exhibitor company may read this QR symbol. This action may complete the suggested requirement of having the prospect visit and interact with the participating exhibitor company at their booth. This "meeting transaction" may be recorded electronically on various database lists. In some embodiments, a graphic representation for the prospect on their mobile device may display the required booths visited and those remaining to be seen. The system may keep track of all the "meeting transactions" via QR reader/symbol interactions between the salesperson and show attendee and may allow updating and compilation for reporting purposes.

In some embodiments, the list of exhibitors, both participating and non-participating, that may possibly be able to supply one or more of the stated needs of the general prospect, may be displayed on the mobile device of the prospect after the prospect has completed a meeting transaction with all the required participating exhibitor companies for that day.

Participation in the program by attendees may be achieved by various inducements such as, for example: being entered into a drawing for a prize, rewarded with a gift card, being personally escorted through the exhibit hall by a third party ambassador, or providing a list of other exhibitors who may provide solutions to the supply needs identified by the prospective customer, or any combination thereof.

In some embodiments the prospects (both general and specific) may have the option of being met by a third party representative known as an ambassador. The ambassador may guide the prospects through the exhibit hall to the locations of the participating exhibitor companies for that day. A prearranged meeting location may be established where the general and specific prospects meet the ambassador. A picture of the ambassador may be provided on the mobile device of the prospects (both general and specific) via the mobile application. The ambassador may have the ability in some embodiments, to download an application onto their mobile device which may provide descriptive information about the general and specific prospects to be met such as name, company, physical description, and photograph, for example. Also included may be information related to the individual interests of the general and specific prospects such as home location, job description, business supply needs, etc. Similarly, information concerning the participating exhibitors in the program to be visited may be communicated to the mobile device of the ambassador through the application. The ambassador may guide the prospects through the exhibition hall to the booths of the participating exhibiting companies and may ensure that the prospects receive "stamps" for the day in the printed booklet and/or through the mobile device of each party, indicating that the prospects and companies have interacted.

Systems and methods described herein may comprise one or more computers, which may also be referred to as processors. A computer may be any programmable machine or machines capable of performing arithmetic and/or logical operations. In some embodiments, computers may comprise processors, memories, data storage devices, and/or other commonly known or novel components. These components may be connected physically or through network or wireless links. Computers may also comprise software that may direct the operations of the aforementioned components. Computers may be referred to with terms that are commonly used by those of ordinary skill in the relevant arts, such as servers, PCs, mobile devices, routers, switches, data centers, distributed computers, and other terms. Computers may facilitate communications between users and/or other computers, may provide databases, may perform analysis and/or transformation of data, and/or perform other functions. Those of ordinary skill in the art will appreciate that those terms used herein are interchangeable, and any computer capable of performing the described functions may be used. For example, though the term "smartphone" may appear in the specification, the disclosed embodiments are not limited to smartphones.

Computers may be linked to one another via a network or networks. A network may be any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMAX, or other wireless connection). Connections between computers may use any protocols, including connection-oriented protocols such as TCP or connectionless protocols such as UDP. Any connection through which at least two computers may exchange data can be the basis of a network.

Figure 11:
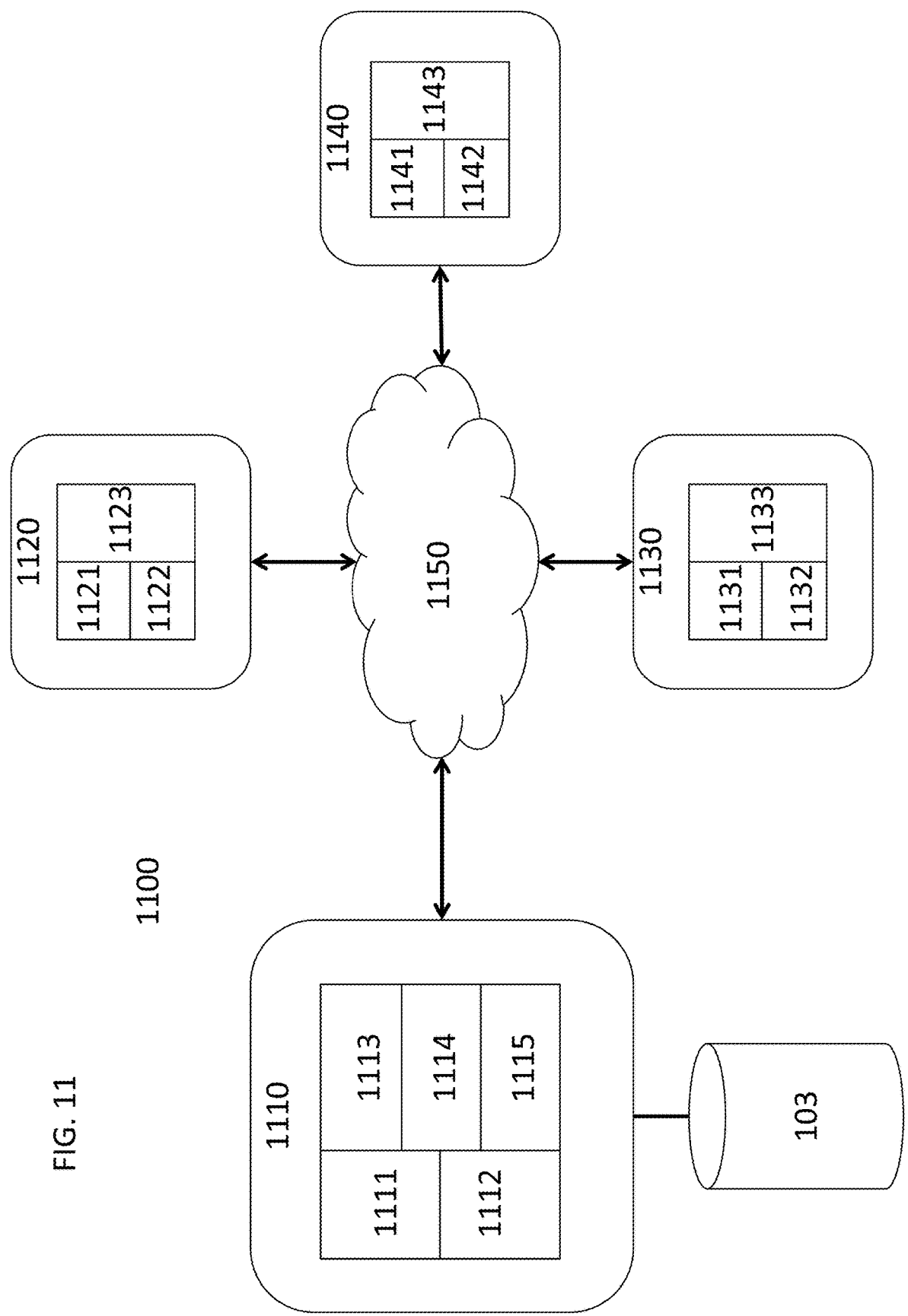
FIG. 11 is an interaction facilitation system according to an embodiment of the invention.

FIG. 11 is an interaction facilitation system 1100 according to an embodiment of the invention. The system 1100 may enable the interaction processes described in detail below. At least one server 1110 may communicate with at least one exhibitor device 1120, at least one prospect device 1130, and/or at least one ambassador device 1140 via the Internet or another network 1150.

The server 1110 may include at least one processor 1111 and at least one memory 1112 and may include or be in communication with at least one database 103. The functions of the database 103 and the data stored in the database 103 are described in greater detail below. The server 1110 may include a web module 1113 which may serve a web site 101 on the network 1150 and/or perform other communications via the network 1150 using hardware, software, and/or firmware of the server 1110. Details about the web site 101 are described in greater detail below. The server 1110 may include a registration module 1114 which may receive, process, and transmit exhibitor, prospect, and/or ambassador data as discussed below. The server 1110 may also include a facilitation module 1115 which may use registration module 1114 data and/or data in the database 103 to facilitate interactions between device 1120/1130/1140 users as discussed below.

Devices 1120/1130/1140 may be smartphones, tablets, personal computers, or other computers. Each device 1120/1130/1140 may include at least one processor 1121/1131/1141 and at least one memory 1122/1132/1142. The exhibitor device 1120 may include an exhibitor module 1123 that may include an app installed on the exhibitor device 1120. The exhibitor module 1123 may allow the exhibitor device 1120 to communicate with the server 1110 and other devices 1130/1140 via the network 1150 using hardware, software, and/or firmware of the exhibitor device 1120 and/or may perform other functions as described in greater detail below. The prospect device 1130 may include a prospect module 1133 that may include an app installed on the prospect device 1130. The prospect module 1133 may allow the prospect device 1130 to communicate with the server 1110 and other devices 1120/1140 via the network 1150 using hardware, software, and/or firmware of the prospect device 1130 and/or may perform other functions as described in greater detail below. The ambassador device 1140 may include an ambassador module 1143 that may include an app installed on the ambassador device 1140. The ambassador module 1143 may allow the ambassador device 1140 to communicate with the server 1110 and other devices 1120/1130 via the network 1150 using hardware, software, and/or firmware of the ambassador device 1140 and/or may perform other functions as described in greater detail below.

FIG. 1 is a block drawing related to the uploading of registration information according to an embodiment of the invention. The system may include the web site 101 that may be generated by the web module 1113 of the server 1110, the master accumulated database 103, participating company exhibitors at a trade show 104 (which may have their own exhibitor devices 1120), general prospect information 106 from participating exhibitors 104 (e.g., sent by the exhibitor module 1123 over the network 1150 to the registration module 1114 of the server 1110), specific prospect information 107 from participating exhibitors 104 (e.g., sent by the exhibitor module 1123 over the network 1150 to the registration module 1114 of the server 1110), and/or general prospect attendee 108 a & b and specific prospect attendee 109 a & b to a trade show (which may have their own prospect devices 1130). The examples herein are presented in the context of a trade show exhibition. Nevertheless, the disclosed systems and methods may also apply to other modes of identifying, engaging, tracking, and alerting related to referrals of potential customers to businesses or other connections between entities. The web site 101 may utilize data in the master accumulated database 103. The accumulated database may include, but is not limited to, information for qualifying general and specific company exhibitor prospects and attendee identification, contact information, and business supply needs.

In order to populate the web site 101 with content, a participating company exhibitor 104 may register with the system. The registration may be transmitted 110 by the exhibitor module 1123 over the network 1150 to the registration module 1114 of the server 1110. In addition to transmitting registration information, the exhibitor 104 may provide information 111 describing a subset within an industry that may be likely potential purchasers of the products and/or services of the exhibitor, which may be referred to as general prospect individuals 106. The exhibitor 104 may also provide information 113 describing a group of individuals who comprise a subset of the general prospects, which may be referred to as specific prospects 107. Information about the specific prospects may include, but is not limited to, name, title, phone number, email, type of business, and business locations, etc.

Similarly, general prospect 108 a & b and specific prospect 109 a & b attendees to a trade show may transmit 115, by the prospect module 1133 over the network 1150 to the registration module 1114 of the server 1110, information registering them for the program, possibly identifying themselves by, but not limited to, name, title, company, company address, phone, fax, email, photograph, physical description, areas of interest, etc. The general prospect 108 a & b and specific prospect 109 a & b attendee may also upload information related to their desire to discover qualified suppliers at a trade show who may be able to fulfill current and future business supply needs. Such information concerning supply needs may be garnered via, but is not limited to, the use of provided industry category listing forms as well as attendee submitted general descriptions.

Figure 2:
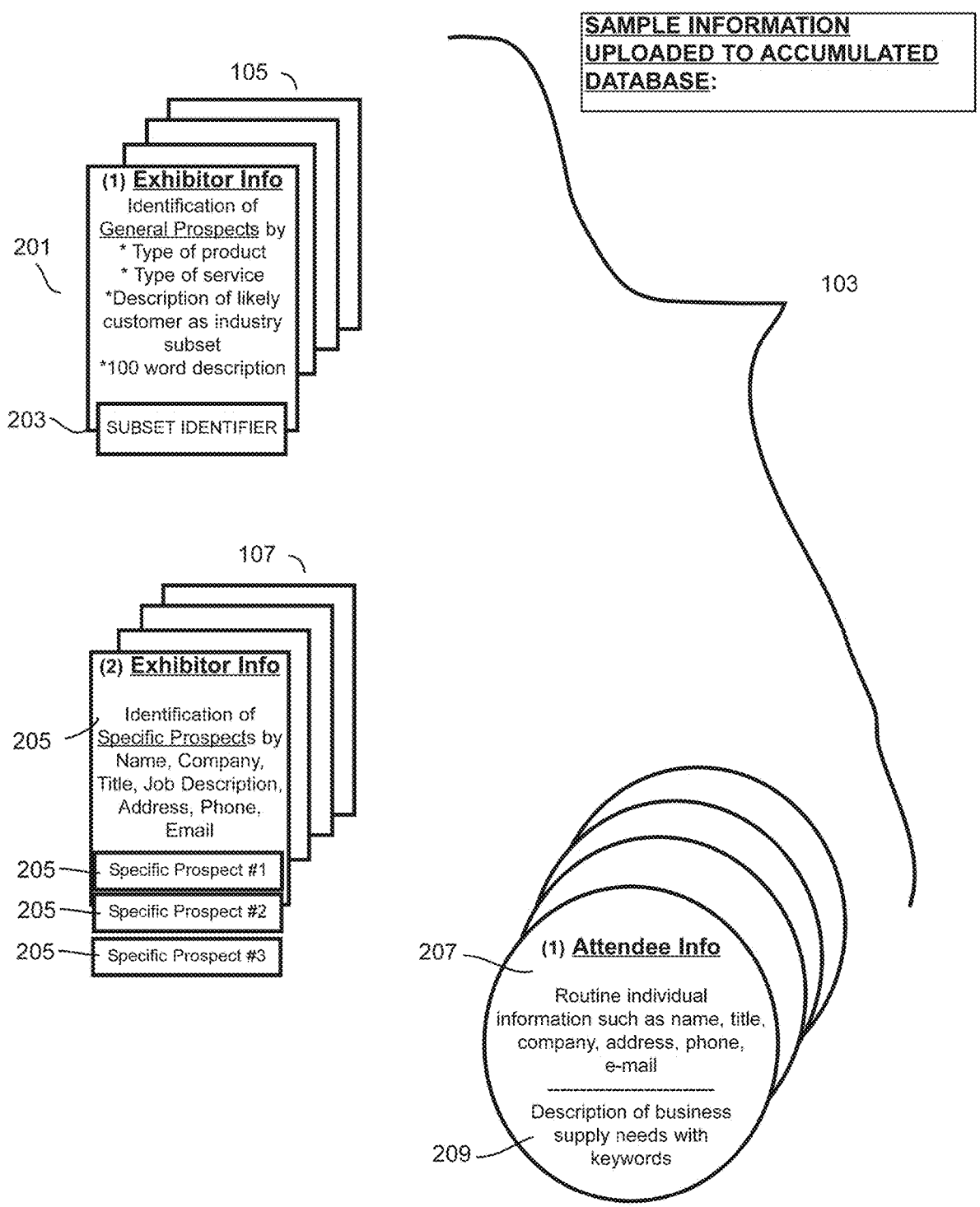
FIG. 2 illustrates exhibitor and attendee database records according to an embodiment of the invention.

FIG. 2 illustrates exhibitor and attendee database records according to an embodiment of the invention. FIG. 2 illustrates an example of the types of records that may be uploaded to the database of potential exhibitors and attendees for the system 103. In some embodiments, the database 103 may include information from the exhibitors participating in the program such as the types of products and services they offer for sale and a description of a general prospect 201 which may include, but is not limited to, type of business, purchaser's title and/or job description, and typical supply needs of the general prospect.

Figure 3:
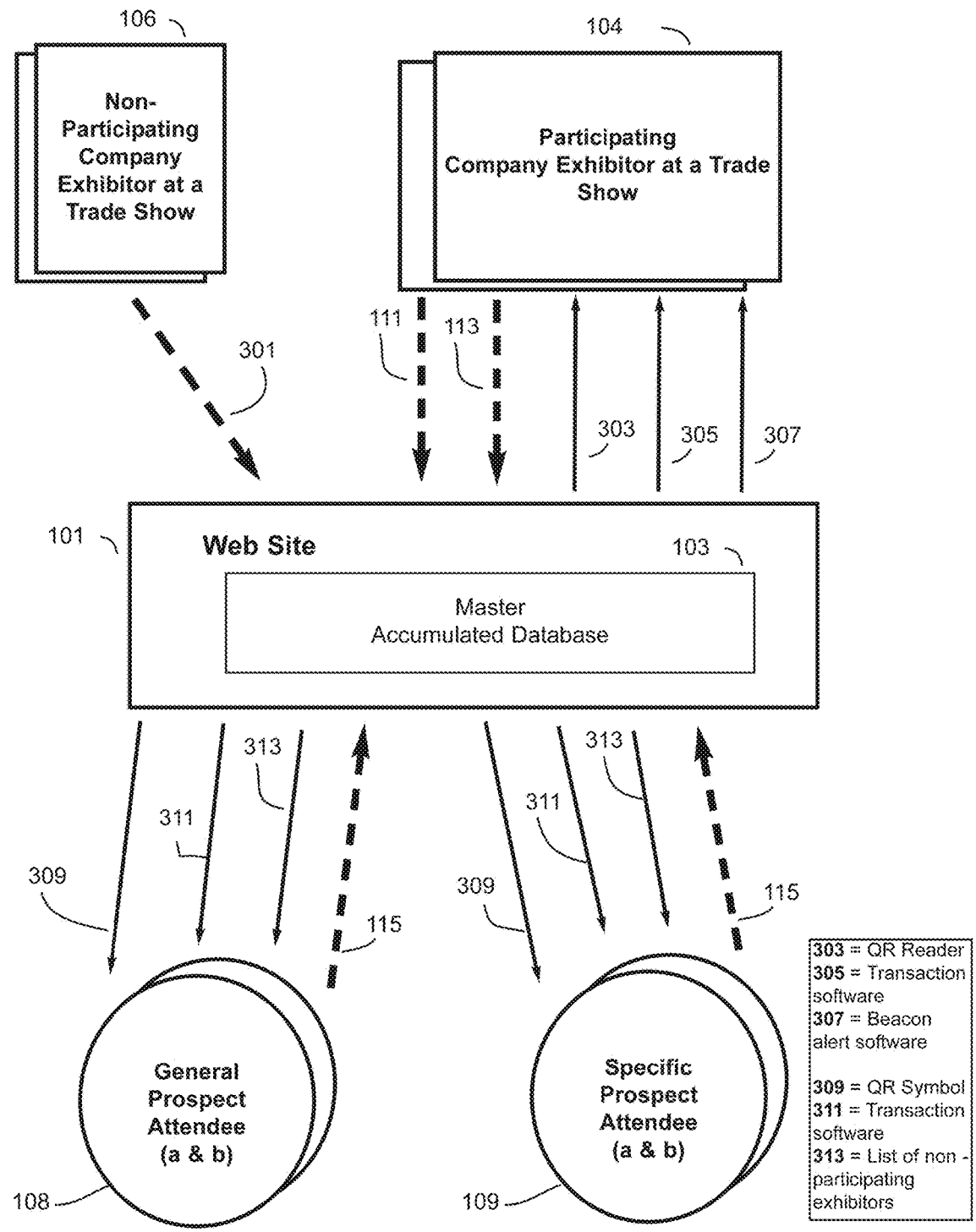
FIG. 3 is a block drawing illustrating a process of uploading and downloading information and software by participating exhibitors and attendees and non-participating exhibitors according to an embodiment of the invention.

FIG. 3 is a block drawing illustrating a process of uploading and downloading information and software by participating exhibitors and attendees and non-participating exhibitors according to an embodiment of the invention. Once a participating exhibitor has registered and uploaded their general prospect attendee information 111 and specific prospect attendee information 113, they may be able to download an application onto their mobile device 1120 from the facilitation module 1115 of the server 1110 which may include a unique QR reader 303 capable of scanning the unique QR symbol of the general and/or specific attendee 311 who may be participating in the program. The application may enable processing and/or recording of a meeting transaction 305 between the prospect attendee and the participating exhibitor. The application may also notify 307 the participating exhibitor via visual or auditory prompts, for example using geo-fencing and beacon technology, which may indicate the location of their identified specific prospects within a set radius, for example 100 feet. The application may be capable of archiving the date, time, and/or other information of the meeting transaction, updating and displaying lists of general and specific prospects that may have completed meeting transactions, and/or other real time reporting functions. The visual prompt may or may not include a photograph of the specific prospect obtained from, for example, public records, social media web sites, or provided by the specific prospect themselves, or other sources. The location identification component may allow the exhibitor to track the location of their specific prospect in real time and to know the proximity of the specific prospect as they approach or pass by. The application may aid the exhibitor in directing their attention to the near proximity of an identified specific prospect.

Upon completion of the registration process 115, the general prospect attendee 108 may be able to download an application onto their mobile device 1130 from the facilitation module 1115 of the server 1110 which may include, but is not limited to, a unique QR symbol 309 that may link to their registration information on the master accumulated database 103, a list of required trade show booths to be visited in order to be eligible for rewards, and/or a map of the trade show floor which may identify the location of required booths to be visited. For example, graphics (which may appear as a coupon with stamps, for example) may be updated in real time to indicate display booths that have been visited and booths remaining to be visited 311 and 1001 (see FIG. 10). The application may also display a list 313 of discovered trade show exhibitors who may be able to provide supply solutions to the identified business needs of the attendee that may or may not be available to the attendee after the required booths are visited.

Figure 4:
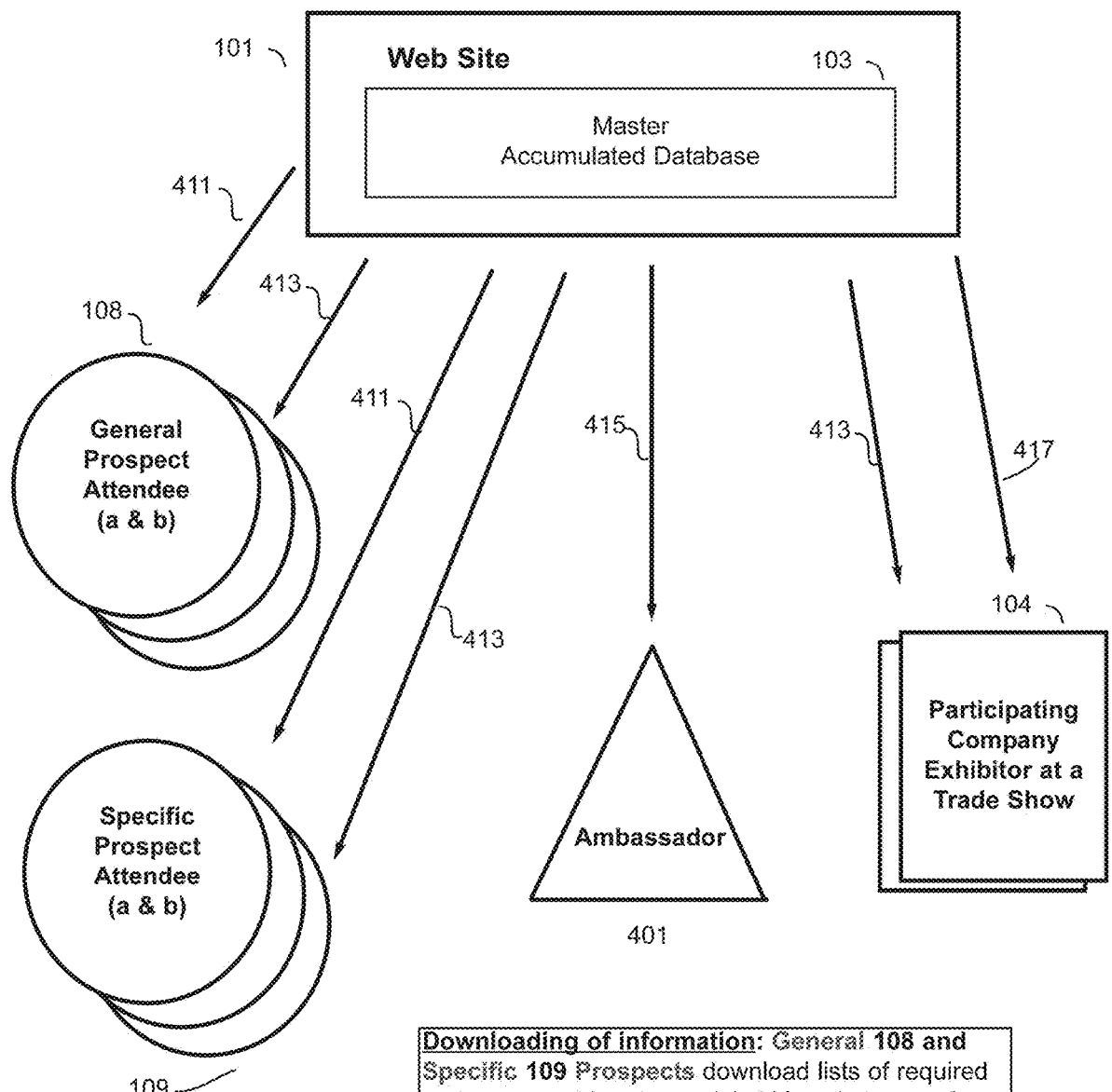
FIG. 4 is a block drawing illustrating a method for downloading information related to participating parties according to an embodiment of the invention.

FIG. 4 is a block drawing illustrating a method for downloading information related to participating parties according to an embodiment of the invention. General prospect attendees 108 (a & b) and specific prospect attendees 109 (a & b) may be able to download to their mobile device 1130 from the facilitation module 1115 of the server 1110 lists of required and requested booths to be visited in order to qualify for a reward program 411. Additionally, a picture of the ambassador 401 who may be available to guide the attendee around the trade show floor to the booths of participating exhibitors may be downloaded 413. The ambassador 401 may be able to download 415 to their mobile device 1140 from the facilitation module 1115 of the server 1110 lists of general prospect attendees 108 (a & b) and specific prospect attendees 109 (a & b) and pictures of each, a QR reader and QR symbol, and/or a list of required booths to visit with general prospect attendees 108 (*a*) and specific prospect attendees 109 (*a*). Participating exhibitors 104 may be able to download information 413 concerning general prospect attendees 108 (a & b) and specific prospect attendees 109 (a & b) along with pictures of specific prospect attendees 109 (a & b) and a picture of the ambassador 401.

FIG. 12 illustrates sample screen shots of mobile devices of participating general and specific attendees 1130 and the mobile device of an ambassador 1140 according to an embodiment of the invention. To aid in the connection between the ambassador and willing general and specific prospect attendees for the purpose of having the ambassador guide those attendees to the booths of participating exhibitors, basic information about the other party may be downloaded to the mobile device 1130/1140 of each party. The mobile device 1140 of the ambassador may receive general information and a picture, if available, 415 about the general and specific prospect attendees who are participating in the program and may wish to be guided to the booths of participating exhibitors by the ambassador from the facilitation module 1115 of the server 1110. The general and specific prospect attendees who desire to have the ambassador accompany them to the booths of participating exhibitors receive information about the ambassador on their mobile device 1130, that may or may not include a picture of the ambassador 413, from the facilitation module 1115 of the server 1110.

Figure 5:
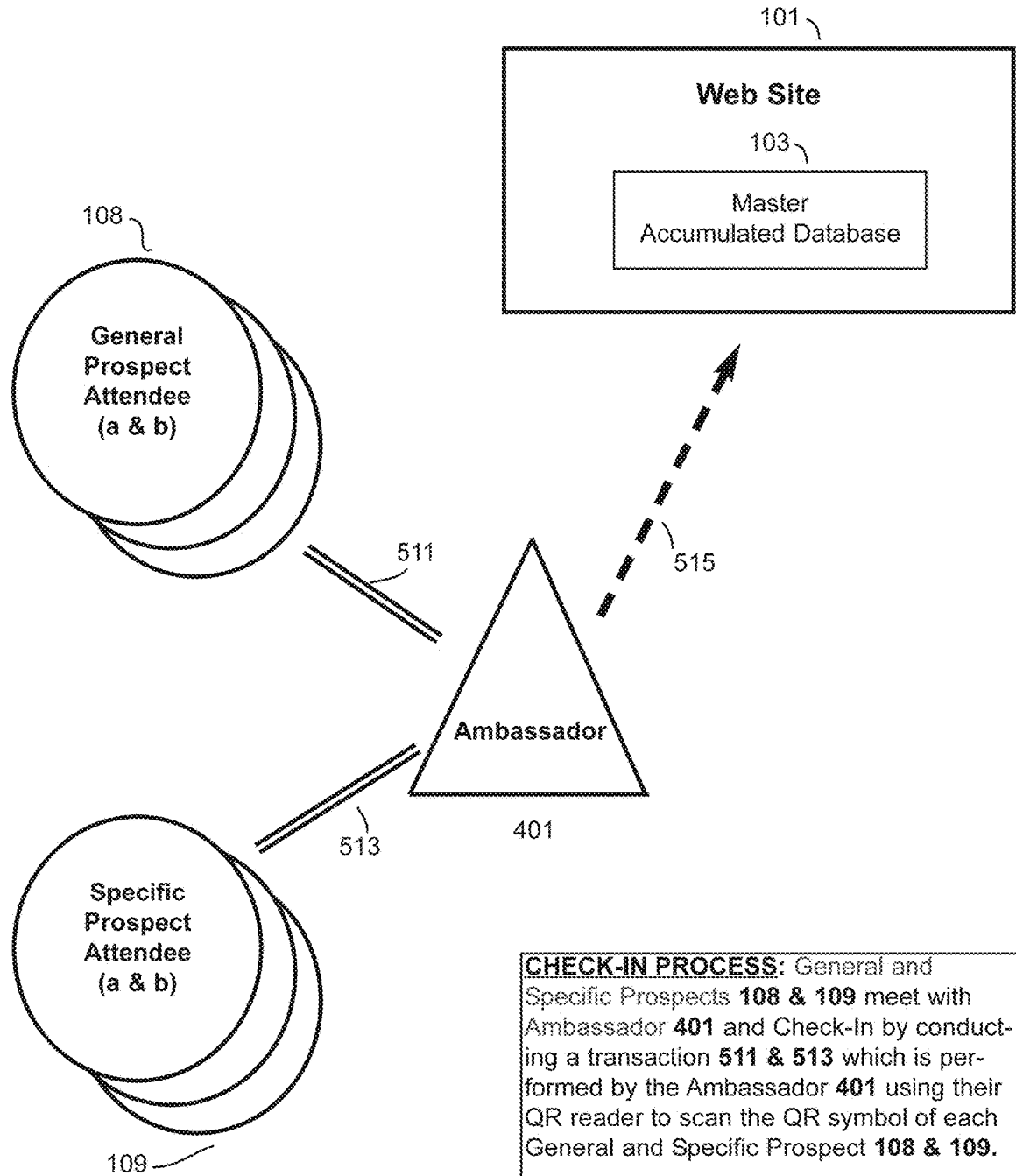
FIG. 5 is a block drawing illustrating a checking in process according to an embodiment of the invention.

FIG. 5 is a block drawing illustrating a checking in process according to an embodiment of the invention. This check-in process may be performed between general prospect attendees 108 (a & b) and specific prospect attendees 109 (a & b) and ambassador 401. The ambassador 401 may meet the general prospect attendees 108 (a & b) and specific prospect attendees 109 (a & b) at a specific location which may be, but is not limited to, the trade show registration area, show entrance doors, etc. The ambassador may register 511 the general prospect attendees 108 (a & b) and specific prospect attendees 109 (a & b) attendees 513 by activating a QR reader and scanning the QR symbol on the corresponding mobile device 1130 of the general prospect attendees 108 (a & b) and specific prospect attendees 109 (a & b), for example. The ambassador's mobile device 1140 may upload the meeting transaction information to the web site 101.

Figure 6:
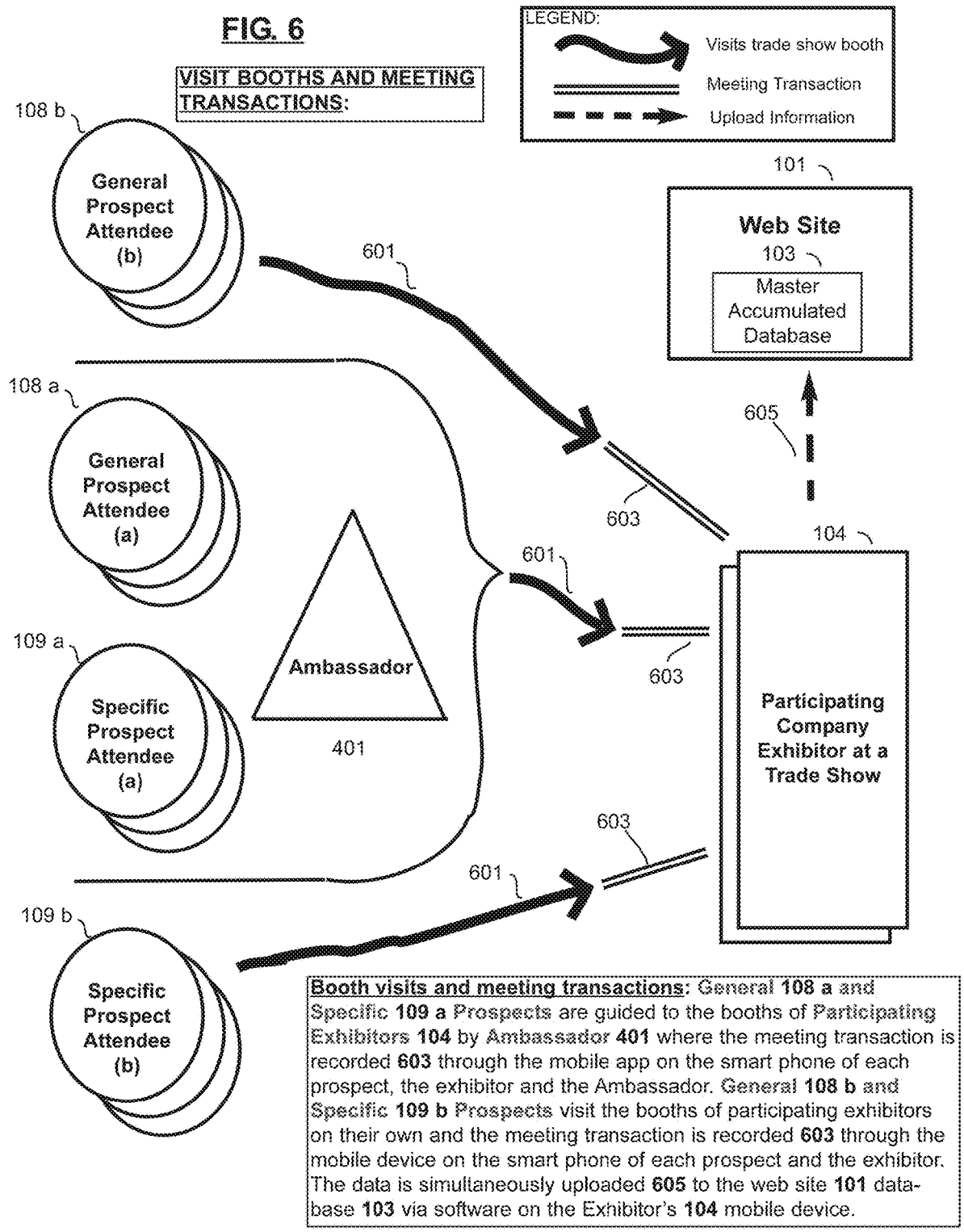
FIG. 6 is a block drawing of trade show booth visits and meeting transactions according to an embodiment of the invention.

FIG. 6 is a block drawing of trade show booth visits and meeting transactions according to an embodiment of the invention. General prospect attendees 108 (a & b) and specific prospect attendees 109 (a & b) may visit the booths of participating exhibitors. In some cases, a subset of general prospect attendees 108 (*a*) and specific prospect attendees 109 (*a*) may agree to be guided 601 to the booths of participating exhibitors 104 by the ambassador 401. Another subset of general prospect attendees 108 (*b*) and specific prospect attendees 109 (*b*) may decide to visit the booths 601 of participating exhibitors 104 without the aid of the ambassador 401. In some cases, all general prospect attendees 108 (*b*) and specific prospect attendees 109 (*b*) may decide to visit the booths 601 of participating exhibitors 104 without the aid of the ambassador 401. When each of these subset groups meets at the booth of the participating exhibitor, a meeting transaction may be registered. This may be achieved by the QR reader on the mobile device 1120 of the participating exhibitor scanning the QR symbol on the mobile device of the general prospect attendees 108 (a & b) and specific prospect attendees 109 (a & b). Additionally, participating exhibitors 104 may scan the QR symbol of the ambassador 401, thereby registering a meeting transaction 603. Meeting transactions 603 may be uploaded via the mobile device 1120 of the participating exhibitor to the web site 605.

Figure 7:
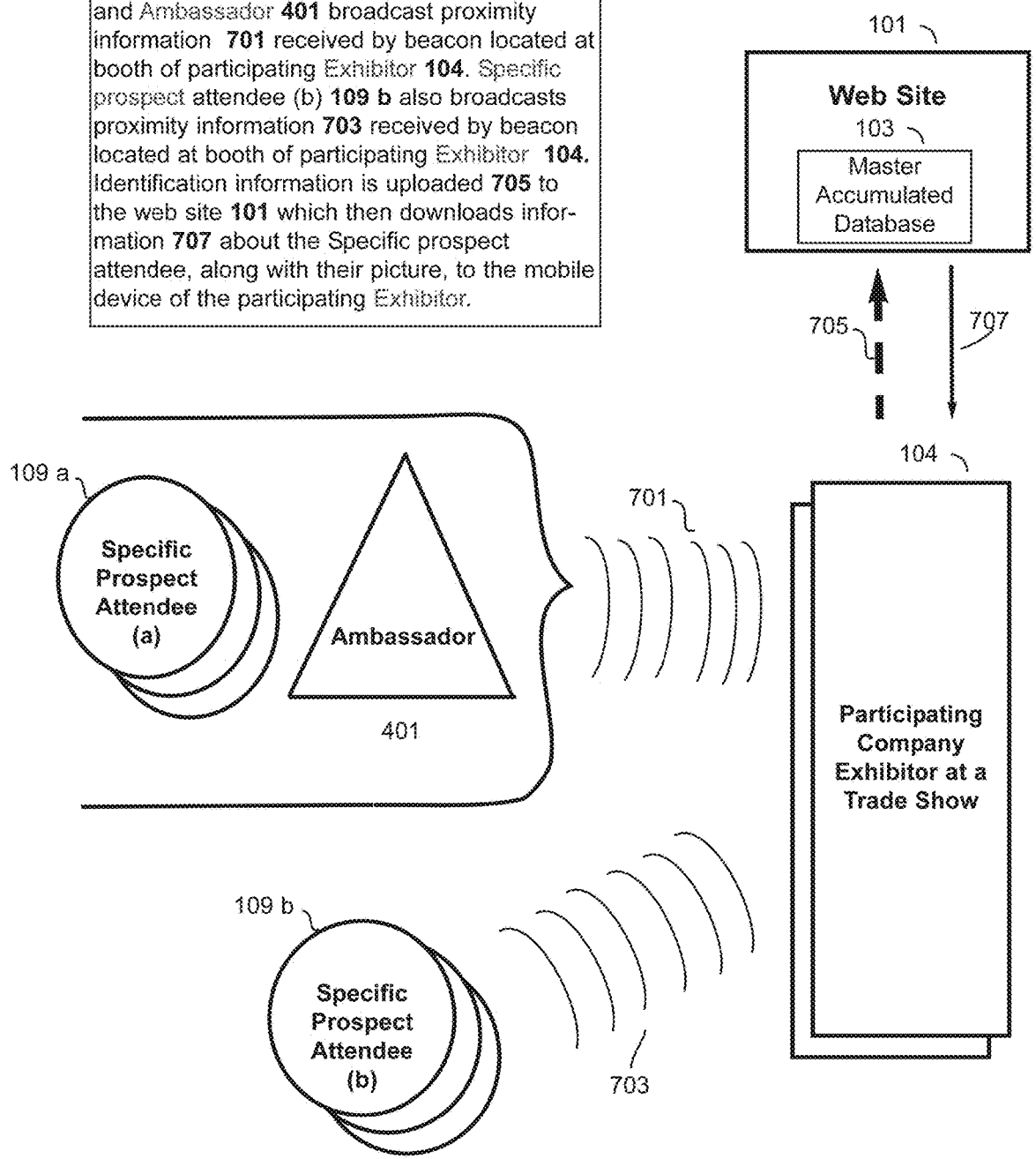
FIG. 7 is a block drawing of a discovery of attendees' process according to an embodiment of the invention.

FIG. 7 is a block drawing of a discovery of attendees' process according to an embodiment of the invention. This may include an alert process associated with the proximity of specific prospect attendees 109 (a & b). When specific prospect attendees 109 (*a*) who are being guided by an ambassador 401 and/or specific prospect attendees 109 (*b*) who visit the booths of participating exhibitors on their own are within a predefined range (e.g., 100 feet or less) of the booths of participating exhibitors, a signal may be communicated to the web site 101 via standard WI-FI connections from the mobile device 1120 of the participating exhibitor or in some other way. The web site 101 may download information 707 about the specific prospect attendee that may or may not include a picture, and an alert may appear on the mobile device 1120 of the participating exhibitors. This process may or may not include the use of beacons located at the booths of participating exhibitors and/or held by prospects in place of or in conjunction with the software on the mobile device 1120 of the participating exhibitor.

FIG. 8 illustrates sample screen shots on the exhibitor mobile device 1120 of proximity locations of attendees according to an embodiment of the invention. Screen shot 801, being used here as an example, illustrates how the proximity location of three different specific prospect attendees 109 (a & b) (numbers 3, 7, and 12) may be displayed within three concentric circles similar to a bull's eye target with the participating exhibitor located in the center of the bull's eye target. 805 may indicate that the specific prospect attendee is within a distance of 100 to 50 feet, for example. 807 may indicate that the specific prospect attendee is within a distance of between 50 and 10 feet from the participating exhibitor, for example. 809 may indicate that the specific prospect attendee is within a distance of under 10 feet from the participating exhibitor, for example. From screen shot 801 the participating exhibitor may be able to progress on to the next screen 803 for a different proximity perspective. Screen shot 803, being used here as an example, illustrates how the proximity location of three different specific prospect attendees (numbers 3, 7, and 12) may be displayed with aisles and rows similar to a standard trade show exhibition hall. 811 may indicate that the specific prospect attendee is located two aisles over, behind the participating exhibitor, for example. 813 may indicate that the specific prospect attendee is in the next row over, to the right and behind the participating exhibitor, for example. 815 may indicate that the specific prospect attendee is within the same aisle as the participating exhibitor, coming from the left, for example.

Figure 9:
FIG. 9 is a sample screen shot on the mobile device of a participating exhibitor according to an embodiment of the invention.

FIG. 9 is a sample screen shot on the mobile device 1120 of a participating exhibitor according to an embodiment of the invention. These may be sample screens of the specific prospect attendee information 707 downloaded to the mobile device 1120 of the participating exhibitor. Screen shot 901, being used here as an example, may include basic information about the specific prospect attendee 905 such as, but not limited to, name, title, and company and may include a picture 907. From screen shot 901 the participating exhibitor may be able to progress on to the next screen 903 for more detailed information about the specific prospect attendee, such as, but not limited to, company location, business overview, and current or future supply needs.

FIG. 10 is a sample screen shot on the mobile device 1130 of an attendee according to an embodiment of the invention. This sample screen may include a graphic that may be downloaded to the mobile device 1130 of the general prospect attendees 108 (a & b) and specific prospect attendees 109 (a & b) that may show the total booths to be visited to be included in the rewards program and the symbol 1003 that may indicate a complete meeting transaction with a participating exhibitor. In some embodiments, a rewards program may require general prospect attendees 108 (a & b) and specific prospect attendees 109 (a & b) to collect indications that they have visited certain participating booths. For example, a booklet may be created with advertisements and coupon stamp pages. Each coupon stamp page may correspond to a single day and may contain the company names and booth locations of each participating exhibitor. The trade show attendee may be required to visit each of the participating booths and receive a mark or stamp within a square on the coupon page corresponding to the participating exhibitors for that day. Once all the stamps have been received, the attendee may submit their completed form into an entry pool to be eligible to win a prize and/or receive a gift card. Simultaneously, a record of the booths visited and still required may be displayed in graphic form on the mobile device of the attendee. In some embodiments, the stamps may be collected and submitted electronically via the mobile device of the attendee.

Example Uses:

Note that the following are example uses, according to embodiments of the invention. Those of ordinary skill in the art will see that many modifications can be made to the example uses that would still fit within the scope and spirit of embodiments of the invention.

Example of how the Database May be Generated and Updated when the Participating Exhibitors are Visited What the Data Looks Like:

The mobile device of the attendee may receive a new download of information after the required booths of participating exhibitors are all visited for that day. The information may include reference to the part or service desired, name of relevant exhibitor and location of that exhibitor on the trade show floor (e.g.—"Congratulations Tim! You have completed visiting the required booths for today. We were able to identify some exhibitors here at the show who supply the (aircraft tires) you were looking for. They are: (1) 'Aviall' at booth 527; (2) 'Aircraft Tire Company' at booth 1124 and (3) 'Desser Tires' at booth 313.")

How the Original Information is Displayed:

The original information may be accumulated by the system through the website which may pose a series of questions to the attendee concerning current and future business supply needs during the registration process, such as:

"Does your company have a new product in development? Or is there a new project you're working on?

"Please tell us what kind of suppliers we can introduce you to (engineers, hardware suppliers, repair companies, etc.

"May we introduce you to a new supplier as an alternative source for your companies supply chain?

"How would you answer this question?

"'It would be great if I could find someone who could ___,'"

Examples of responses to the above questions may be as follows:

"Does your company have a new product in development? Or is there a new project you're working on?

"Response:

Yes we are currently planning on expanding our building to accommodate new repair capabilities for aircraft oxygen repair, overhaul and testing "Please tell us what kind of suppliers we can introduce you to (engineers, hardware suppliers, repair companies, etc.

"Response:

We are currently in need of consultants who are familiar with test equipment and procedures for setting up an oxygen overhaul facility.

"May we introduce you to a new supplier as an alternative source for your companies supply chain?

"Response:

Sure. We are always looking for sources of spare parts such as armatures, brushes and electronic components.

"How would you answer this question?

"'It would be great if I could find someone who could ___,'

"Response:

Help us set up our new capabilities in oxygen overhaul by hiring qualified technicians, buying the needed test equipment and securing a steady source of spare parts."

Exhibitors to the trade show may be contacted through standard marketing practices and may be encouraged to register on the website. A standardized form may be presented on the website to the registering exhibitor company. When the form is presented, the system may assign a record number to that registering company exhibitor. Each record number may be a numerical code and may be assigned sequentially to each subsequent registrant. Each record may contain fields to capture the input information. The fields may request information such as company name, company address, company phone number, business type description, general prospect description, or typical purchaser's title, or any combination thereof.

Additionally, the website may pose a "primary question" to the exhibitor such as:

"Please tell us about your business. What product or service do you provide? What type of business would buy from you and what are the typical job titles of the person within that prospective business who would select your company? Also, is there any particular product or service you are promoting here at the trade show?

"Note that this is too general, 'We sell aircraft parts.'

"This is better: 'We sell Learjet parts for corporate jets bought by the director of maintenance'"

Additionally, to capture information concerning exhibiting companies to a trade show who have not registered on the website, the system may access the websites of all registered exhibitors which may be available from the convention organizers website.

First, the system may access the list of exhibiting companies to the trade show. As an example, the first company name on a list of exhibitors to trade show "XX" may be company "AAA Supply". The system may then compare this exhibiting company's name against the list of names of exhibiting companies who have already registered. If the company name matches a name on the list, the system may then conclude that company "AAA Supply" has already registered on the website. The system may then review the fields within that company's record. If all the fields are completed for company "AAA Supply", the system may proceed to the next exhibitor company name on the list of exhibitors at trade show "XX".

In the event that information is missing from a field in the record for company "AAA Supply", the system may assemble a list of incomplete fields, attempt to discover that information, and enter it into the relevant field in the record for company "AAA Supply". As an example, company "AAA Supply" may have not completed the field for general prospect description. The system may access the internet and may perform a standard search (e.g., using the Google search engine or some other method) for that company's website, "AAA Supply" in the current example. The system may perform a keyword search for the missing information, "general prospect description" in the current example, within the descriptive paragraph presented by the search engine results as well as within the "knowledge graph" about company "AAA Supply" if provided on the page of the search results. By way of example, the keyword search may seek a match with phrases such as, "selling to" or "bought by". If a match is found, the system may then copy the remaining words after the phrase until a grammatical period is encountered. The system may then enter those words within the incomplete field for "general prospect description" with the record of company "AAA Supply". If the missing field information is not obtained through this first effort, the system may access the website of company "AAA Supply" in the current example. The system may then access each page of the website for company "AAA Supply" and perform a keyword search for the missing field information "general prospect description" in the current example.

Once all the missing field information has been searched, the system may proceed onto the next company name on the list of exhibiting companies to trade show "XX", which by way of example may be company "BBB Manufacturing". The system may then perform the same comparison set of commands to ascertain if company "BBB Manufacturing" has already registered and if there is missing field information. If company "BBB Manufacturing" has not registered on the website, the system may create a new record for company "BBB Manufacturing" including a record number. The system may perform a name search for company "BBB Manufacturing" on a standard search engine as described above and may perform key word searches on the results page, knowledge graph, and "BBB Manufacturing" website to discover the missing information to complete the fields in the record for company "BBB Manufacturing". In the present example, key word searches may be performed to complete the field of "address" by performing a key word search for the phrase "address" and, if found, the following group of words which may encompass the complete address of "BBB Manufacturing may be copied, such as "123 Industry Drive, South Bend, Ind. 46617"

For each exhibiting company, a record may be created with nearly complete fields within the master database. Each record may contain separate fields for various aspects of the record, for example record number, company name, company address, company phone number, business type description, general prospect description, or typical purchaser's title, or any combination thereof. For example, to ascertain the information for "business type description", the system may perform a standard key word search for the following terms:

Deliver to _____
Cost effective _____
Providing our customers with _____
For _____
Capabilities include _____
Supply of _____
Provides _____
We make _____
We sell _____
We repair_____"

When the system encounters words such as "Deliver to", it may copy the next group of words after this statement until a grammatical period is reached. The system then may access the North American Industry Classification System (NAICS) maintained by the United States Census department, perform a keyword search against the list of industry classifications maintained by the NAICS, and enter the resulting data into the missing field of "business type description".

The system may compile the keyword search results along with the answer to the "primary question" within a standard relational database associated with the exhibitor. The system may then compare the keywords provided by the attendees in response to the questions concerning current and future business supply needs.

How the Data Base is Updated when the Participating Exhibitor is Visited:

The attendee may activate their copy of the mobile application, access the unique QR symbol that relates to their account, and have it "read" by the QR reader from the copy of the mobile application that the participating exhibitor has downloaded. The meeting transaction information, such as the names and companies of each of the parties as well as the date and time of the meeting, may be recorded electronically and archived for future reference.

When the unique QR Symbol associated to the trade show attendee is displayed on their mobile device, the participating exhibitor may activate the QR reader portion of the software which they downloaded onto their mobile device. The two mobile devices may be held up to face one another, and the mobile device of the participating exhibitor may scan the image on the mobile device of the trade show attendee. Once the image is recognized, the mobile device of the participating exhibitor may access the local WI-FI network and connect to the website through the internet.

Example of how the Beacon Notification Process May Work

Overview:

The beacon notification process may alert a participating exhibitor that one of his pre-identified high value prospects (VIP) is within range of his trade show booth so that the exhibitor may stop whatever else he is doing and focus his attention on the approaching VIP. The beacon notification process may identify who the VIP is, the direction he is coming from, and the distance from the exhibitor.

Specifics:

Trade show attendees who are taking part in the program may have their mobile device configured into a transmitting beacon device or may be provided a beacon device which may be handheld or in wearable form (e.g. decorative pin, wrist watch, wrist band, lanyard, sticker, etc.)

If the mobile device of the attendee is to be configured as a transmitting beacon or if the attendee is provided a beacon device, the following actions may take place. The trade show attendee may download the software (e.g., from current mobile application software sites such as Google Play, the iPhone App store, the website, etc.). The mobile device of the attendee may be assigned a UUID (Universally Unique Identifier) number. A UUID number may be a near unique number of 32 alphanumeric characters broken into five groups separated by hyphens, a total of 36 alphanumeric characters long. The likelihood of the number being randomly duplicated may be remote. The mobile device of the attendee, acting as a beacon device, may then transmit a UUID signal which may be at the 2.4835 GHz frequency, for example. The mobile device of the trade show attendee may transmit the UUID signal as long as the device is in the power "on" mode. Therefore, the UUID signal may be broadcast even if the software is not currently active or even if the mobile device of the attendee is in inactive (sleep) mode. The trade show attendee may be required to ensure that Bluetooth capabilities are activated on the mobile device containing the software.

The UUID signal may be receivable within a distance of up to 100 feet by any mobile device of a participating exhibitor who has downloaded the receiving software and been provided with an exclusive activation code number. Participating exhibitors may register on the website and download the software (e.g., from existing application software sites such as Google Play, the iPhone App store, the website, etc.). As part of the downloaded software, the participating exhibitor may be assigned its own unique UUID number as described above, which may be referred to as a "PE" (participating exhibitor) number. Additionally, before the trade show begins, exhibitors who are participating in the program may be provided with an exclusive activation code number from the system (e.g., via an email or SMS message for multiple mobile devices associated to that participating exhibitor). The activation code may be in the form of an eight numeral character set created randomly (e.g., with the Mersenne Twister algorithm software) using digits, upper case letters, and lower case letters. Using Mersenne Twister may allow 218,340,105,584,896 possible codes. Creation of an exclusive activation code number by this method may cause the likelihood of the number being randomly duplicated to be remote Therefore, only exhibitors who pay a fee and are considered to be participating in the program may have the ability to activate the software which may alert them to the proximity within the trade show hall of one of their prospects.

For illustrative purposes, if the trade show attendee (example—"Mr. Paul Wang") has his mobile device activated to perform as a transmitting beacon or is provided a device which acts as a transmitting beacon, the UUID signal from that device may be transmitted between 1-100 times per second. The UUID signal may be received by the mobile device of the participating exhibitor (example—"XYZ Company") at a distance between 100 feet and 1 inch, for example. When the UUID signal is received, the downloaded software on the mobile device of XYZ Company may access an available Wi-Fi network and connect to the internet. The software on the mobile device of XYZ Company may connect to the website and may transmit XYZ Company's PE number. The system may receive the PE number and may compare the PE number to a list of registered participating exhibitors. If there is a match, the system may send a signal back to the mobile device of XYZ Company requesting the exclusive activation code which may have been previously provided to the mobile device of XYZ Company. The mobile device of XYZ Company may then transmit back through the internet connection the previously received exclusive activation code. The system may compare this exclusive activation code against the list of codes assigned to participating exhibitors. If there is a match, the mobile device of XYZ Company may be contacted and requested to transmit to the website the UUID code number received from the mobile device of Mr. Paul Wang, the trade show attendee. The UUID code may then be compared against the list of participating program attendees who have registered and may have been assigned a UUID code. If there is a match, the system may generate and transmit a push notification to the mobile device of XYZ Company with information related to that UUID number. The information may concern Mr. Paul Wang, the attendee associated to that UUID number, and may include information such as his name, title, company, address, phone, email, and image if provided and/or acquired during the attendee registration process.

The software may then indicate on XYZ Company's mobile device a graphically displayed grid map which may show three surrounding rows and aisles from the exhibitor's (XYZ Company) current location, for example. The proximity of the mobile device operated by Mr. Paul Wang may be displayed on the map. As stated above, the mobile device of the trade show attendee may transmit a signal at the 2.4835 GHz frequency between 1 and 100 times per second. The mobile device of XYZ Company may continually monitor that transmitted signal and, based upon the strength of the signal (e.g., the Received Signal Strength Indication (RSSI)), may determine the distance between XYZ Company's mobile device and the mobile device of Mr. Wang. For example, the location of the trade show attendee may be displayed on the grid map in the form of a tear drop image shown horizontally, vertically, or diagonally. The pointed portion of the tear drop image may indicate the direction in which the trade show attendee is travelling. The software may also display the distance and direction of the trade show attendee ("Paul Wang is approaching 30 feet to your left"). The software may also alert the participating exhibitor to the proximity of the attendee with a visual or audio notification or both.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments.

In addition, it should be understood that any figures that highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A method for facilitating interactions, the method comprising:
  performing processing associated with receiving, using a facilitation module, an exhibitor device, a prospect device, and an ambassador device all in communication over a network, exhibitor information about an exhibitor comprising a prospect definition for the exhibitor identifying information about a prospect of interest to the exhibitor and an exhibitor Quick Response (QR) reader for the exhibitor;
  performing processing associated with storing the exhibitor information in a database;
  performing processing associated with receiving, using the facilitation module in communication with the network, prospect information about the prospect comprising a business need of the prospect and a prospect QR code for the prospect;

performing processing associated with storing the prospect information in the database;

performing processing associated with receiving, using the facilitation module in communication with the network, ambassador information about an ambassador comprising an ambassador QR reader and an ambassador QR code for the ambassador;

performing processing associated with storing the prospect information in the database;

performing processing associated with capturing, using the ambassador QR reader of the ambassador device in communication with the facilitation module and the network, the prospect QR code of the prospect device with the ambassador QR reader in order to link together the ambassador information and the prospect information, the capturing comprising the ambassador QR reader reading the prospect QR code to collect data linked to the prospect QR code stored in the database;

performing processing associated with sending a universal unique identifier (UUID) code associated with the prospect QR code of the prospect device to the database, wherein each QR code has a UUID code that is determined by communicating with the database over the network;

performing processing associated with matching by sending a signal back to the exhibitor device requesting an exclusive activation link previously provided to the exhibitor device;

performing processing associated with comparing the UUID code against information in the database assigning UUID codes to prospects; and performing processing associated with sending a push notification to the prospect device associated with the prospect assigned the UUID code when a match is found linking the UUID code to the prospect.

2. The method of claim 1, wherein the exhibitor information and the prospect information is received via a website.

3. The method of claim 1, comprising performing processing associated with identifying a relationship between the business need the exhibitor is able to fulfill and/or the business need of the prospect.

4. The method of claim 1, wherein:
the prospect definition comprises an identity of the prospect; and/or
the prospect information comprises an identity of the prospect.

5. The method of claim 1, further comprising:
performing processing associated with sending, with the facilitation module in communication with the network, the exhibitor information and the prospect information to the ambassador device.

6. The method of claim 1, wherein the exhibitor information and the prospect information enables the ambassador to locate the exhibitor and/or the prospect.

7. The method of claim 1, further comprising performing processing associated with:
receiving, with the facilitation module, information verifying an interaction between: the exhibitor, the prospect, or the ambassador, or any combination thereof, using: the ambassador device, the exhibitor device, or the prospect device, or any combination thereof.

8. The method of claim 1, wherein a beacon is used.

9. The method of claim 1,
wherein the prospect information enables the exhibitor device to locate the prospect device; and/or
wherein the exhibitor information enables the prospect device to locate the exhibitor device.

10. The method of claim 1, comprising performing processing associated with receiving, with the facilitation module in communication with the network, information verifying an interaction between the exhibitor, the prospect, or the ambassador, or any combination thereof.

11. The method of claim 1, wherein each QR code has a UUID that is determined by communicating with the database over the network.

12. The method of claim 1, wherein the facilitation module is configured to:
perform processing associated with sending prospect information to the exhibitor device; and/or
perform processing associated with sending exhibitor information to the prospect device.

13. The method of claim 1, wherein the prospect is from at least two categories of prospects.

14. The method of claim 1, wherein each ambassador QR code is unique; each prospect QR code is unique; each exhibitor QR reader is unique; or each ambassador QR reader is unique, or any combination thereof.

15. The method of claim 1, wherein the prospect is in a general prospect group or a specific prospect group, where the specific prospect group is a sub-group of the general prospect group.

16. The method of claim 1, further comprising: performing processing associated with capturing, using the exhibitor device in communication with the facilitation module and the network, the ambassador QR code and the prospect QR code with the exhibitor QR reader in order to link together the exhibitor information, the ambassador information, and the prospect information.

17. A system for facilitating an interaction, comprising:
a processor;
a database;
a facilitation module in communication over a network with the processor, the database, an exhibitor device, a prospect device, and an ambassador device, the facilitation module being configured to:
perform processing associated with receiving exhibitor information about an exhibitor comprising a prospect definition for the exhibitor identifying information about a prospect of interest to the exhibitor and an exhibitor Quick Response (QR) reader for the exhibitor;
perform processing associated with storing the exhibitor information;
perform processing associated with receiving prospect information about the prospect comprising a business need of the prospect and a prospect QR code for the prospect;
perform processing associated with storing the prospect information;
perform processing associated with receiving ambassador information about an ambassador comprising an ambassador QR reader and an ambassador QR code for the ambassador;
perform processing associated with storing the prospect information;
perform processing associated with capturing the prospect QR code of a prospect device with the ambassador QR reader in order to link together the ambassador information and the prospect information, the capturing comprising the ambassador QR reader reading the prospect QR code to collect data linked to the prospect QR code stored in the database;

perform processing associated with sending a universal unique identifier (UUID) code associated with the prospect QR code of the prospect device to the database, wherein each QR code has a UUID code that is determined by communicating with the database over the network;

perform processing associated with matching by sending a signal back to the exhibitor device requesting an exclusive activation link previously provided to the exhibitor device;

perform processing associated with comparing the UUID code against information in the database assigning UUID codes to prospects; and perform processing associated with sending a push notification to the prospect device associated with the prospect assigned the UUID code when a match is found linking the UUID code to the prospect.

18. The system of claim 17, wherein the exhibitor information and the prospect information is received via a website.

19. The system of claim 17, wherein the facilitation module is configured to perform processing associated with identifying a relationship between a business need the exhibitor is able to fulfill and/or a business need of the prospect.

20. The system of claim 17, wherein:
the prospect definition comprises an identity of the prospect; and/or
the prospect information comprises an identity of the prospect.

21. The system of claim 17, wherein the facilitation module is configured to:
perform processing associated with sending the exhibitor information and/or the prospect information to the ambassador device.

22. The system method of claim 17, wherein the exhibitor information and the prospect information enables the ambassador to locate the exhibitor and/or the prospect.

23. The system of claim 17, further comprising performing processing associated with:

receiving, with the facilitation module, information verifying an interaction between: the exhibitor, the prospect, or the ambassador, or any combination thereof, using: the ambassador device, the exhibitor device, or the prospect device, or any combination thereof.

24. The system of claim 17, wherein a beacon is utilized.

25. The system of claim 17,
wherein the prospect information enables the exhibitor device to locate the prospect device; and/or
wherein the exhibitor information enables the prospect device to locate the exhibitor device.

26. The system of claim 17, wherein the facilitation module is configured to perform processing associated with receiving, information verifying an interaction between exhibitor, the prospect, or the ambassador, or any combination thereof.

27. The system of claim 17, wherein each QR code has a UUID that is determined by communicating with the database over the network.

28. The system of claim 17, further comprising:
performing processing associated with sending prospect information to the exhibitor device; and/or
performing processing associated with sending exhibitor information to the prospect device.

29. The system of claim 17, wherein the prospect is from at least two categories of prospects.

30. The system of claim 17, wherein each ambassador QR code is unique; each prospect QR code is unique; each exhibitor QR reader is unique; or each ambassador QR reader is unique, or any combination thereof.

31. The system of claim 17, wherein the prospect is in a general prospect group or a specific prospect group, where the specific prospect group is a sub-group of the general prospect group.

32. The system of claim 17, wherein the facilitation module is further configured to: perform processing associated with capturing the ambassador QR code and the prospect QR code with the exhibitor QR reader in order to link together the exhibitor information, the ambassador information, and the prospect information.

* * * * *